United States Patent
Rothenbaum

[19]

[11] Patent Number: 6,128,743
[45] Date of Patent: Oct. 3, 2000

[54] INTELLIGENT SYSTEM AND METHOD FOR UNIVERSAL BUS COMMUNICATION AND POWER

[75] Inventor: Perry Rothenbaum, Barrington, Ill.

[73] Assignee: Pertech, Inc., Barrington, Ill.

[21] Appl. No.: 09/162,047

[22] Filed: Sep. 28, 1998

[51] Int. Cl.[7] ....................................... G06F 1/26
[52] U.S. Cl. ............................. 713/300; 710/100
[58] Field of Search ..................... 713/300, 310, 713/320, 330; 710/102, 104, 129, 63, 2, 8, 100; 709/220; 370/386; 323/231; 714/14; 361/686

[56] References Cited

U.S. PATENT DOCUMENTS 5,675,813 10/1997 Holmdahl ............................... 395/750
5,799,196 10/1998 Flannery ................................. 713/320

FOREIGN PATENT DOCUMENTS 411168493A 6/1999 Japan .............................. H04L 12/46

*Primary Examiner*—Gopal C. Ray
*Attorney, Agent, or Firm*—Skjerven Morrill MacPherson LLP; Ken J. Koestner; Margaret M. Kelton

[57] ABSTRACT

A bus hub for connection via a serial bus to a serial bus host hub includes a connector to a power supply, a bus controller and a switch coupled to the bus controller and to the power supply. The switch switches the bus hub between being powered by the power supply and being powered by the power from the serial bus host hub by switching the mode of operation between self-powered mode and bus-powered mode. A system for controlling communication and power in a serial bus includes a serial bus hub for detachably coupling at least one peripheral to a computer system, and a serial bus host hub capable of delivering power to the serial bus hub. The system also includes a power supply coupled to the serial bus hub that delivers power to the serial bus hub. The system also includes a bus controller that receives signals from the computer system through the serial bus, and receiving signals from the serial bus hub. The system also includes a switch that switches the serial bus hub between being powered by the power supply and being powered by the power from a serial bus host hub.

31 Claims, 12 Drawing Sheets

| FIG. 3A | FIG. 3B | FIG. 3C | FIG. 3D |
| FIG. 3E | FIG. 3F | FIG. 3G | FIG. 3H |

INTELLIGENT SYSTEM AND METHOD FOR UNIVERSAL BUS COMMUNICATION AND POWER

BACKGROUND OF THE INVENTION

1. Field of the Invention

The present invention relates generally to serial bus technology and more particularly, to power control and communication in universal serial bus technology.

2. Description of the Related Art

Personal computer systems have attained widespread use. These personal computer systems now provide computing power to many segments of today's society. A personal computer system can usually be defined as a desktop or portable microcomputer that includes a system unit having a system processor with associated volatile and non-volatile memory, a display monitor, a keyboard, a hard disk storage device or other type of storage media such as a floppy disk drive or a compact disk read only memory (CD ROM) drive. One of the distinguishing characteristics of these systems is the use of a system board or motherboard to electrically connect these components together. These personal computer systems are information handling systems which are designed primarily to give independent computing power to a single user or group of users and are inexpensively priced for purchase by individuals or small businesses.

FIG. 1, which is labeled "prior art", represents a typical computer system 2 including a host computer 4 holding a processor and memory (not shown). The peripherals shown connected to the system 2 include a mouse 10, a keyboard 8, a telephone 16 and an external disk drive 14. Each of these peripherals is connected to the system 2 through a number of different interfaces and connectors, with each peripheral having a separate socket and connector.

Many personal computers hold multiple external peripheral interfaces for attaching peripheral devices. For example, a printer and a modem typically require an RS-232 interface, a peripheral disk drive typically requires a Small Computer System Interface (SCSI), a mouse or a keyboard typically requires a third interface. Thus, multiple interfaces become necessary for a personal computer to operate. With each type of interface comes a different type of connector and a different power requirement.

Alternatively, an external hub could be used to serve as a central location for connecting peripheral devices to the computer using the same type of connector. A hub compatible with the Universal Serial Bus (USB) standard offers a single type of connector. One problem with using a USB hub, however, is that there are several power modes supported by the specification, so-called "bus-powered" and so-called "self-powered" modes.

Therefore, it can be appreciated that there is a need for a universal hub that has the advantages of both "bus-powered" hubs and "self-powered" hubs, but in a single hub that has the capability of controlled switching between power modes.

SUMMARY OF THE INVENTION

In accordance with an aspect of the present invention, a bus hub for connection via a serial bus to a serial bus host hub includes a connector to a power supply, a bus controller and a switch coupled to the bus controller and to the power supply. The switch switches the bus hub between being powered by the power supply and being powered by the power from the serial bus host hub by switching the mode of operation between self-powered mode and bus-powered mode.

In accordance with another aspect of the present invention, a system for controlling communication and power in a serial bus includes a serial bus hub for detachably coupling peripherals to a computer system. The system also includes a serial bus host hub capable of delivering power to the serial bus hub and a power supply electrically coupled to the serial bus hub that is capable of delivering power to the serial bus hub. The system also includes a bus controller coupled to the hub that receives signals from the computer system through the serial bus and signals from the serial bus hub. the system also includes a switch coupled to the bus controller and to the power supply. The switch switches the serial bus hub between being powered by the power supply and being powered by the power from a serial bus host hub.

In accordance with an aspect of the invention, a method of operating a serial bus hub to control power allocation and communication for detachably coupling a plurality of peripherals to a computer includes a host hub powered by the computer, and the serial bus hub coupled to a power supply. According to this method, the serial bus hub first determines whether it is receiving power from a power supply, and if the serial bus hub is receiving power from a power supply, the serial bus hub initializes to receive power from the power supply. If the serial bus hub does not receive power from the power supply, the serial bus hub initializes to receive power from an upstream serial bus host hub coupled to the serial bus hub. Once initialized, the serial bus hub supplies power to any peripherals coupled to the hub.

Many advantages are achieved by the described serial bus hub, system and method. One advantage is that the described hub, system and method provide automatic switching and reduced complexity by signaling an upstream host of a switch through a single data line instead of the entire input line received on the serial bus. Another advantage of the described serial bus hub system and method is the use of a Schottky diode on an external power supply in order to isolate a host's power source from the universal serial bus hub's power source as well as to signal the universal serial bus hub that an external power source is being applied.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
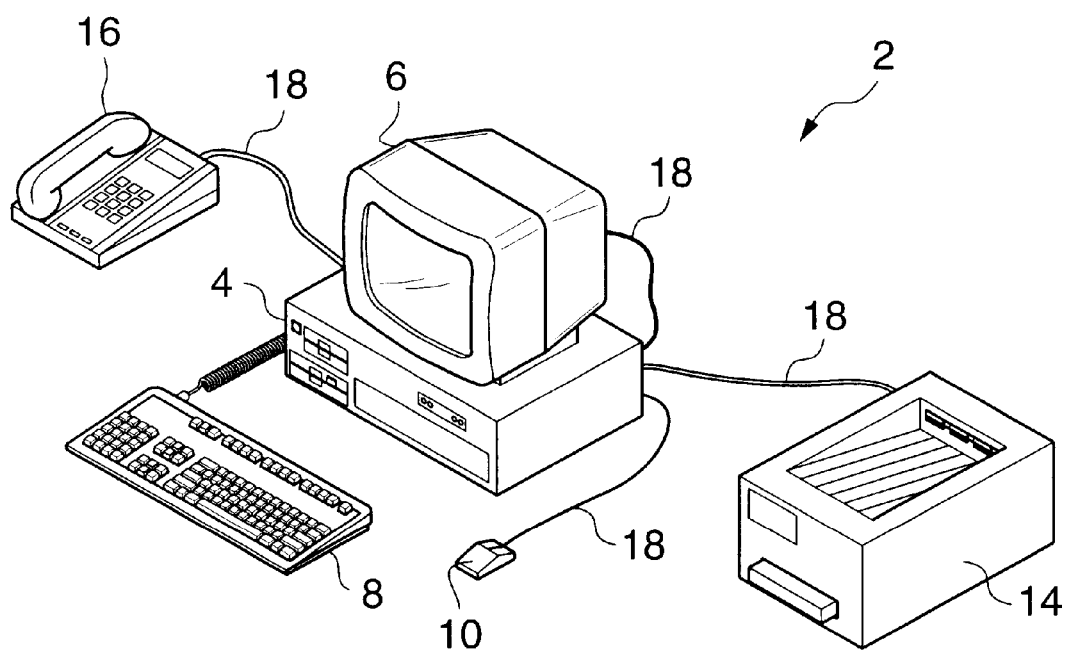
FIG. 1 labeled "Prior Art" represents a computer system with several peripherals attached thereto.

Universal Serial Bus (USB) is a new technology that changes the manner in which peripherals are connected to a computer system. The specification for USB was developed by several computer hardware and software manufacturers in order to overcome the problems discussed above regarding the number of interfaces and connectors required for peripherals attached to personal computers. The USB Specification Revision 1.0, Compaq, Digital Equipment Corporation, IBM PC Company, Intel, Microsoft, NEC and Northern Telecom, Jan. 15, 1996, is expressly incorporated herein by reference ("USB Specification" or "Specification").

Under the USB Specification, compatible peripherals are selectively coupled to a computer system through a universal connector and socket for a universal serial bus. A universal four wire cable for transferring signal and power provides four signals including: Data+, Data−, 5 Volts, and Ground. The Specification provides that information is transmitted across the bus in "packets" with each packet having an address uniquely associated with a logical device, thereby allowing information packets from all linked devices to share the same bus.

USB supports sharing of a signal port among several devices in a hierarchical interconnection. An important part of the interconnection is the ability to plug in hubs with multiple connections, thereby allowing further branching of the hierarchical interconnection scheme. The USB Specification has no limit to the number of hubs and devices that can be connected to the bus, except that the number of addresses allowed by the protocol limits the number on one bus to 127. Given that hubs can be coupled to either another hub or to the host computer, host controller circuitry is present in both the host computer and the host hub. Hereinafter, therefore, the term "host controller" refers to either an upstream host hub controller or a host computer controller.

The hubs are responsible for power management, device support, and connection and disconnection detection among other supporting functions. The host controller provides at least one upstream port for connecting the hub to the host. The specification categorizes two kinds of hubs based on the source of power and the sinking requirements of the hub. The two kinds of hubs are bus-powered and self-powered. A bus-powered hub draws all power from the USB connector coupled to the host controller. Each port for a bus-powered hub supplies 100 mA of load to all downstream ports. A self-powered hub does not draw power from the USB connection, but draws power from another source, for example a power supply coupled to the hub. The Specification provides that self-powered hubs supply 500 mA of current to all external downstream ports. The Specification also identifies three different types of USB devices for use with the different types of hubs. These devices include low-power bus powered devices that draw no more than 100 mA at any time, high-power bus powered devices that draw no more than 100 mA on power up and up to 500 mA after configuration, and self-powered devices that draw up to 100 mA from their upstream connection for interface purposes when the hub is powered down.

Figure 2:
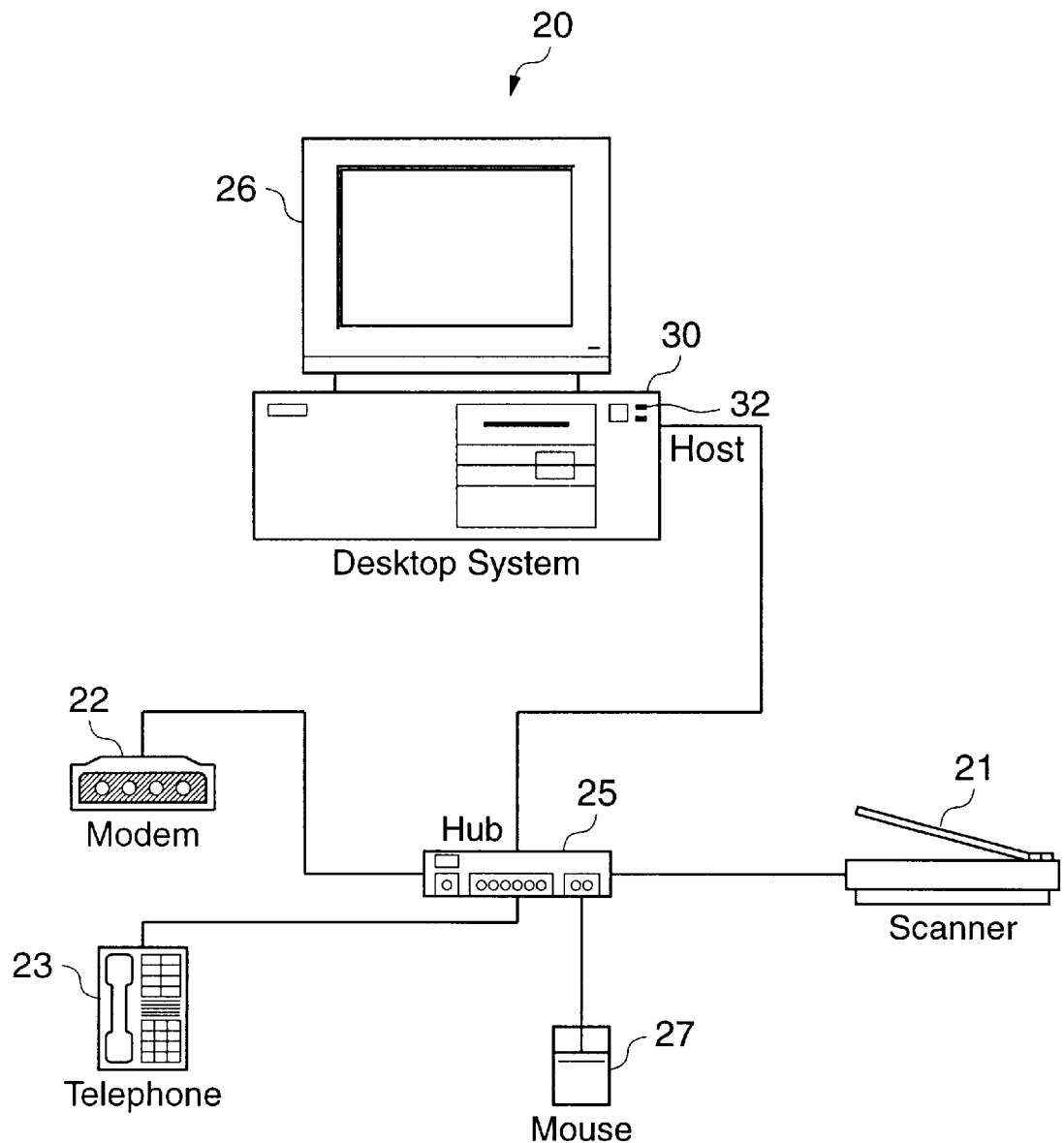
FIG. 2 is a perspective view of a universal serial bus having a host controller, a root hub and several peripherals in accordance with an embodiment of the present invention.

FIG. 2 illustrates an embodiment of the present invention. FIG. 2 shows a computer system 20, including a monitor 26, a USB host controller 30 coupled to a USB port 32, a USB hub 25, and several peripherals coupled to the hub 25. The host controller 30 allows both bus-powered and self-powered devices to operate on the same hub 25. This is accomplished through circuitry shown in FIG. 3 and shown in FIG. 2 which connects between the host controller 30, port 32, coupled to the host controller 30, the hub power supply 200 (FIG.4), and a USB Controller 110 located inside the hub 25. The circuitry accomplishes the switching between the two modes of power operation between the host controller 30 and the hub 25 and peripherals coupled to the hub 25. When a power supply coupled to the hub is powered on, the hub 25 will operate in self-powered mode. When the hub 25 is coupled to the host controller 30 and the hub power supply 200 is powered down, the hub 25 will switch to bus-powered mode. In contrast, when the hub 25 is in bus-powered mode and the power supply 200 is powered on, the hub 25 will switch to self-powered mode. The transition between these two modes is accomplished through logical switching circuitry and detection circuitry as represented in the schematic diagrams in FIG. 3 and FIG. 4. The transition uses an operating method illustrated by the state diagrams shown in FIG. 5.

Figure 3A:
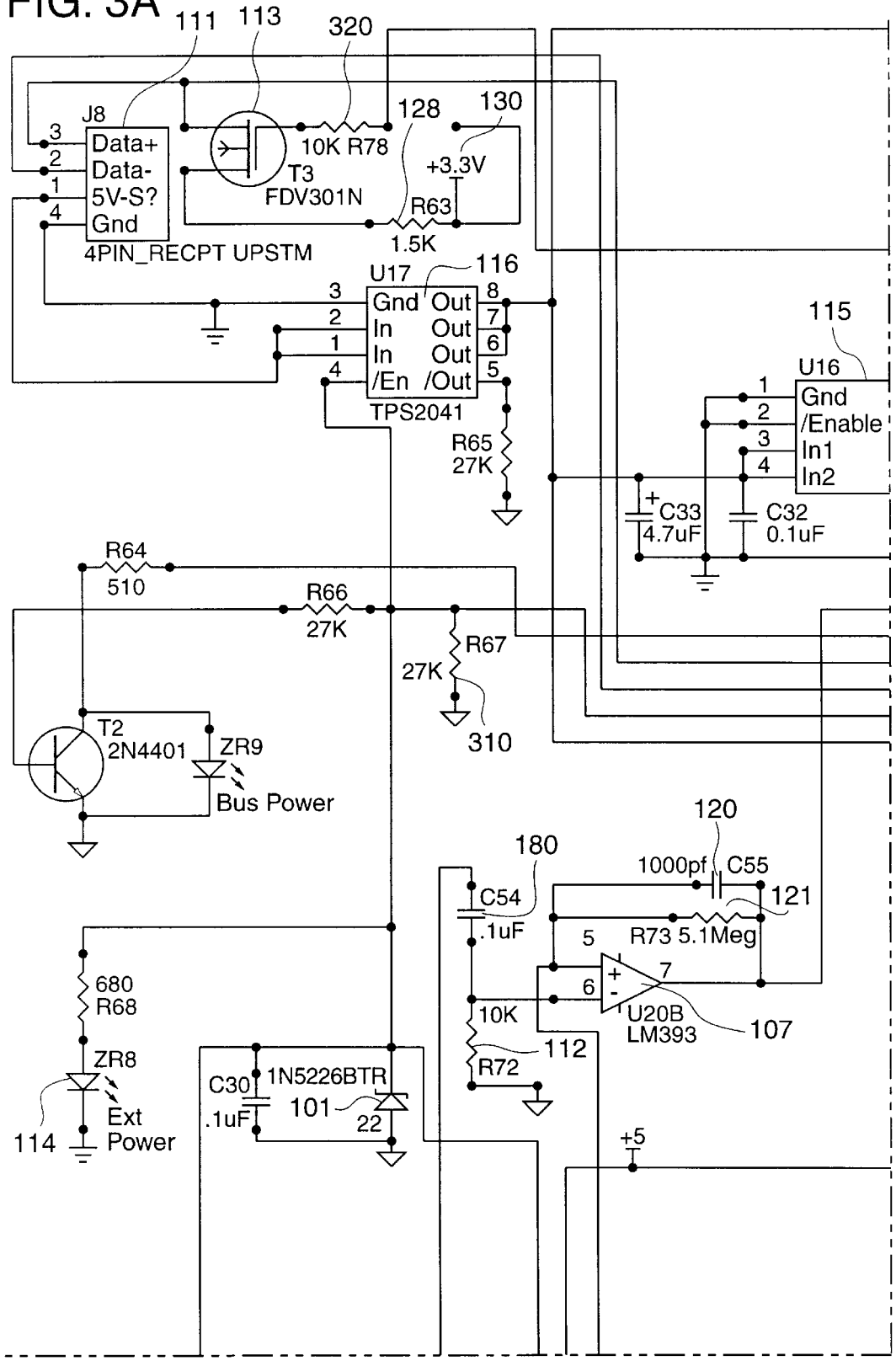
FIG. 3 is a schematic circuit diagram showing a seven port universal serial bus hub in accordance with an embodiment of the present invention.
Figure 3B:
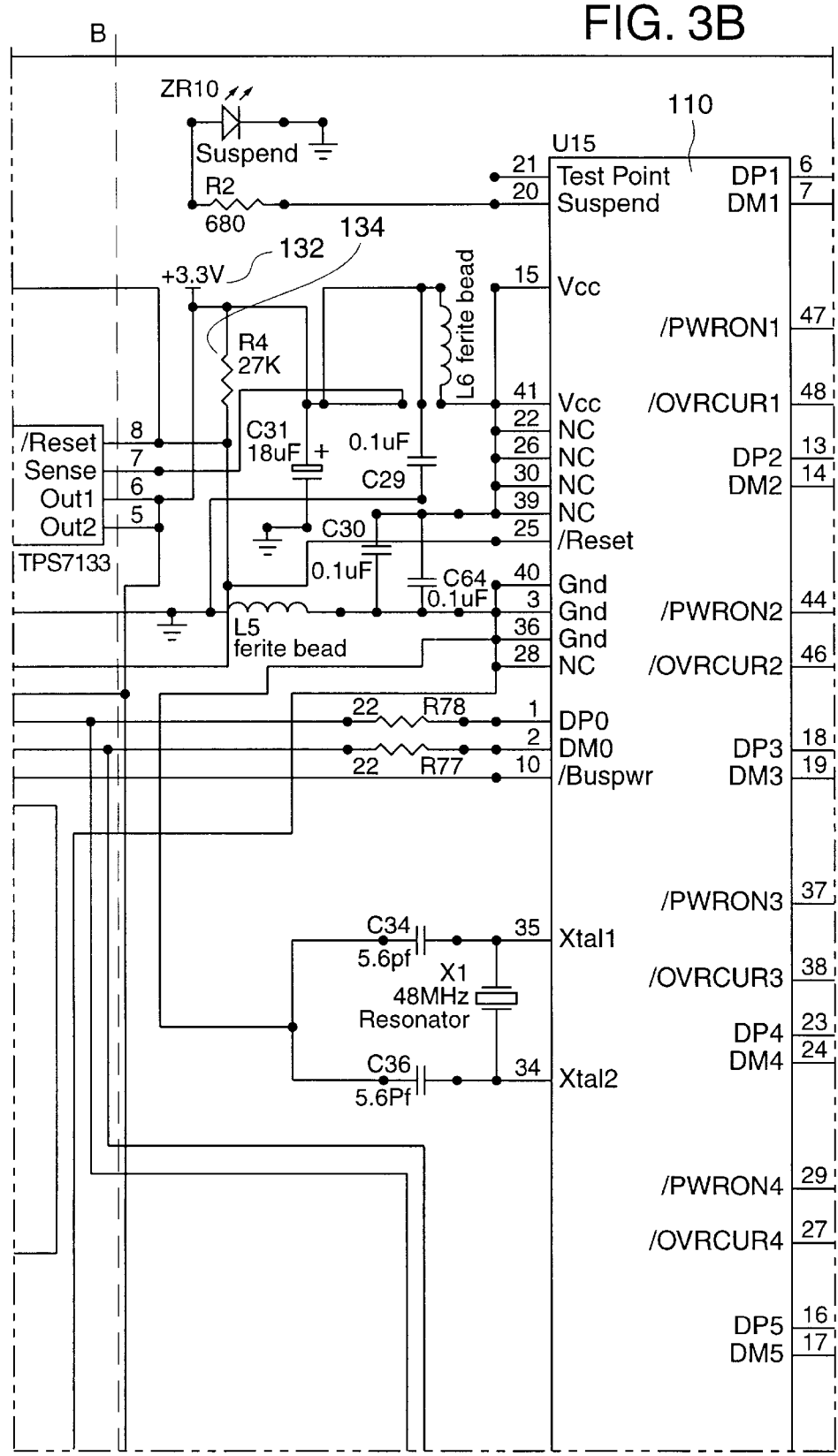
Figure 3C:
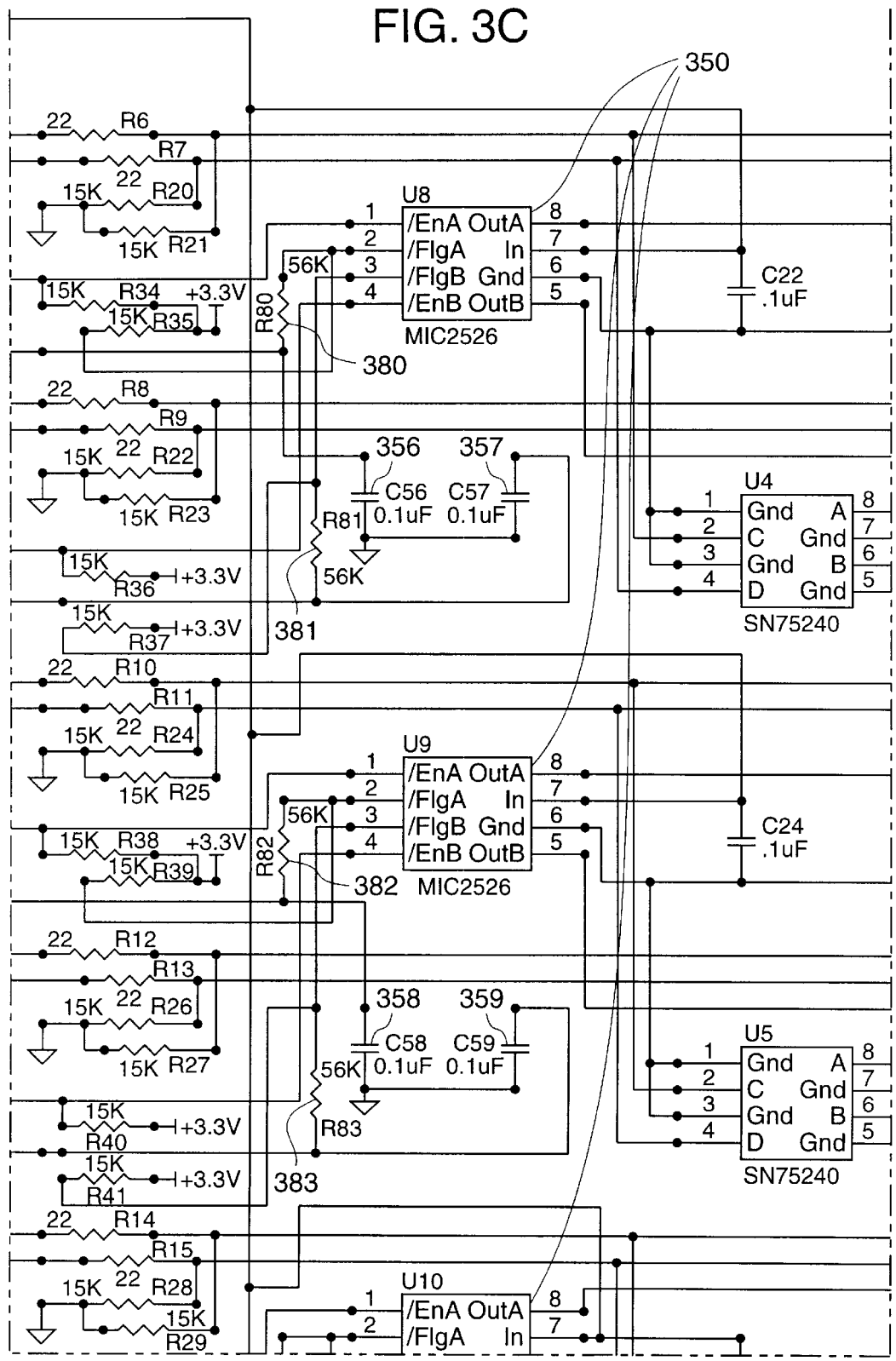
Figure 3D:
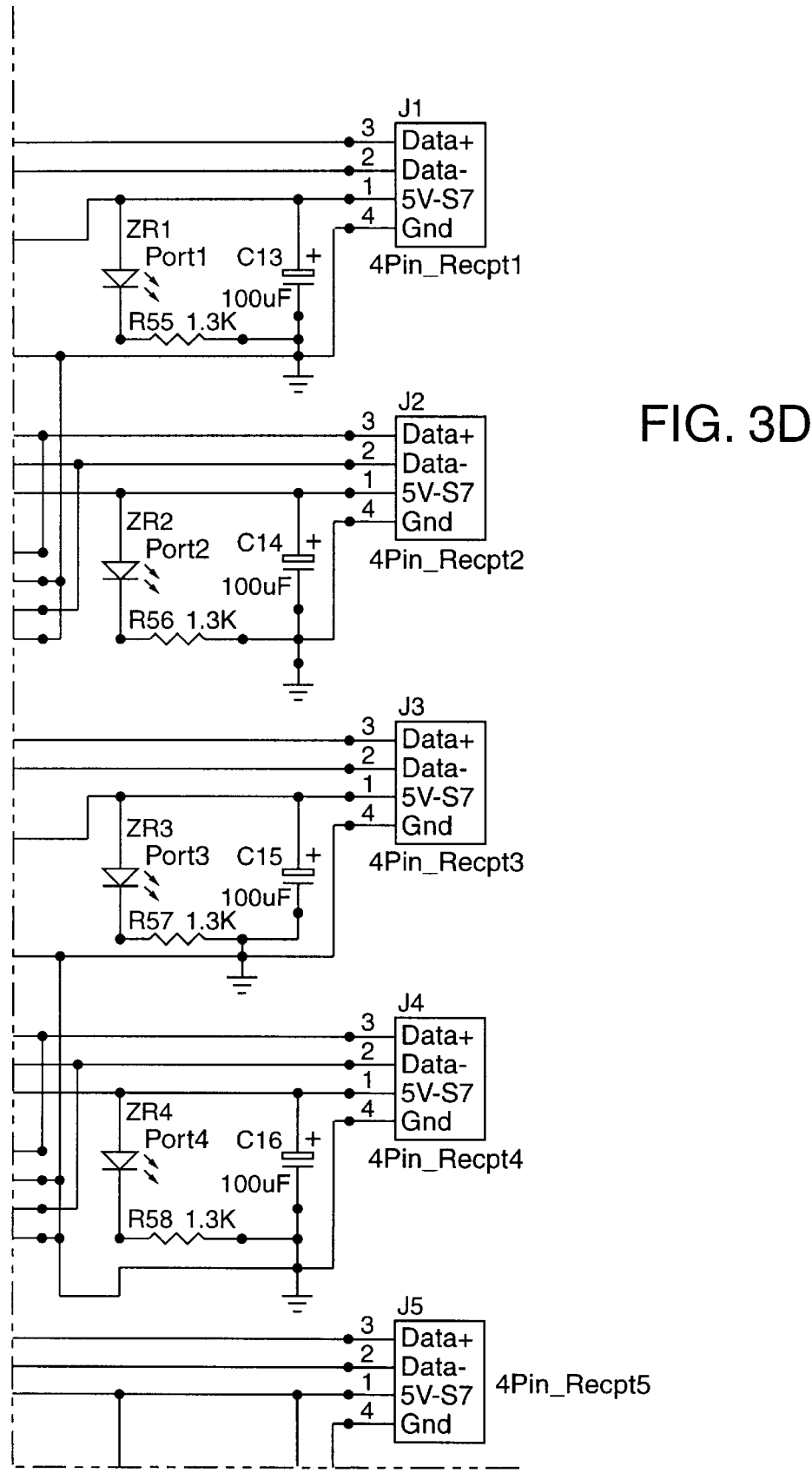
Figure 3E:
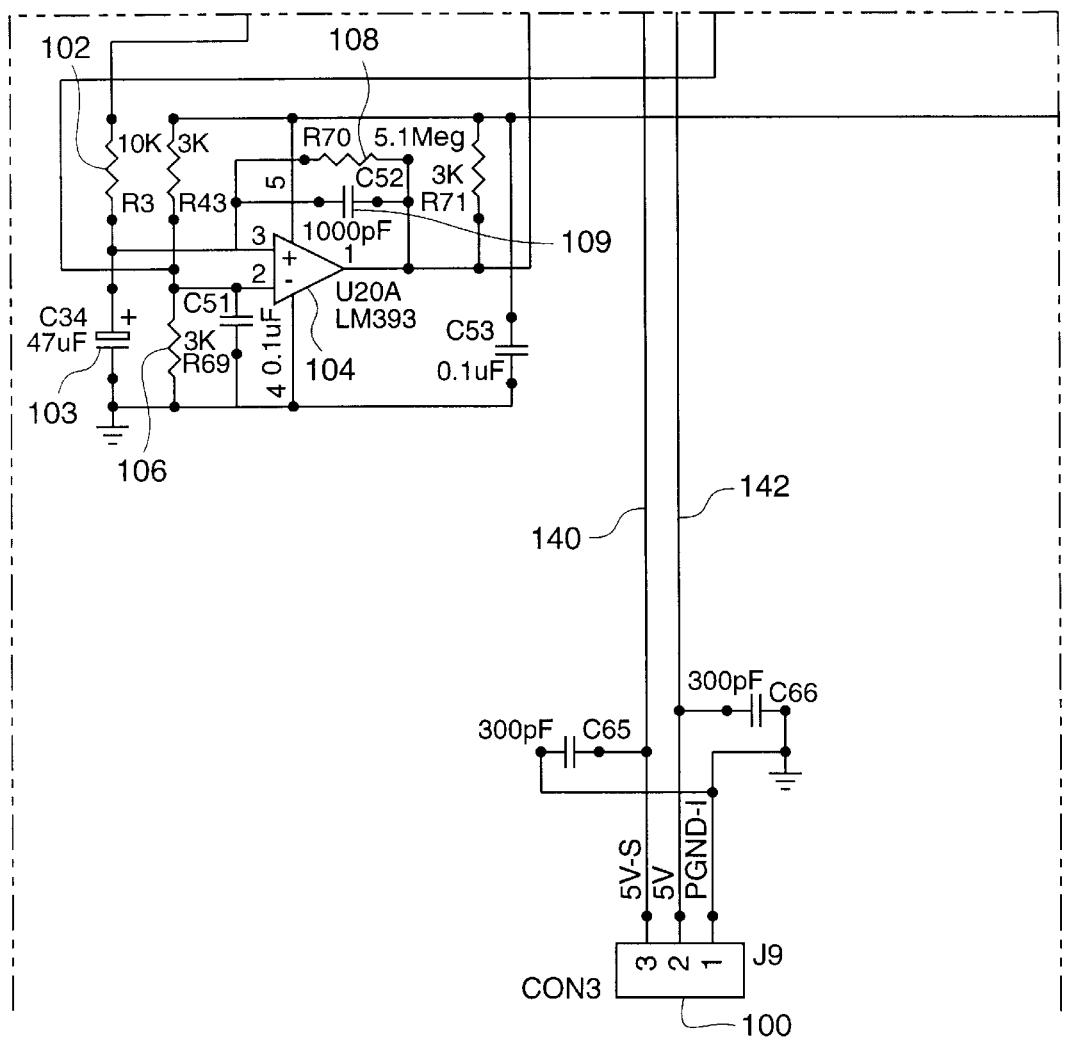
Figure 3F:
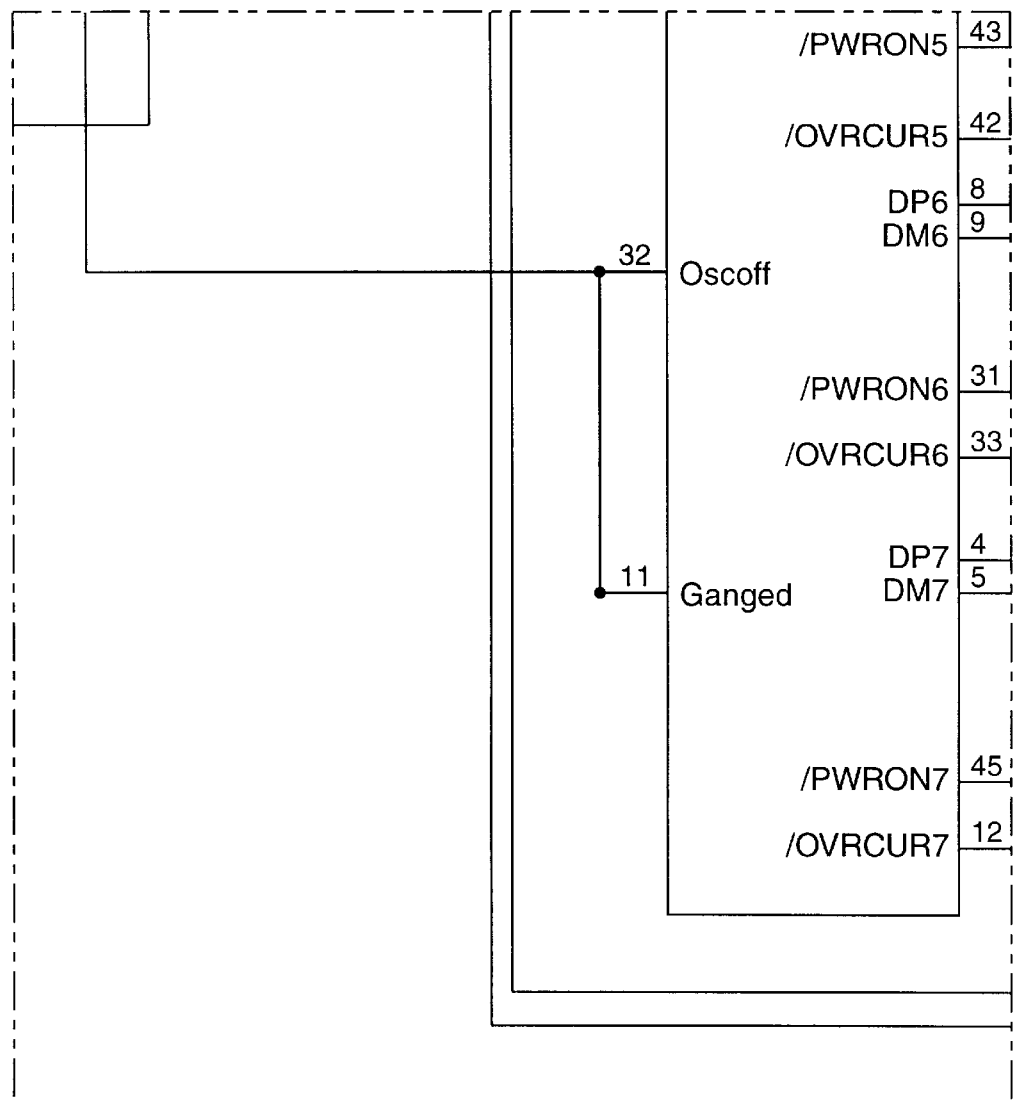
Figure 3G:
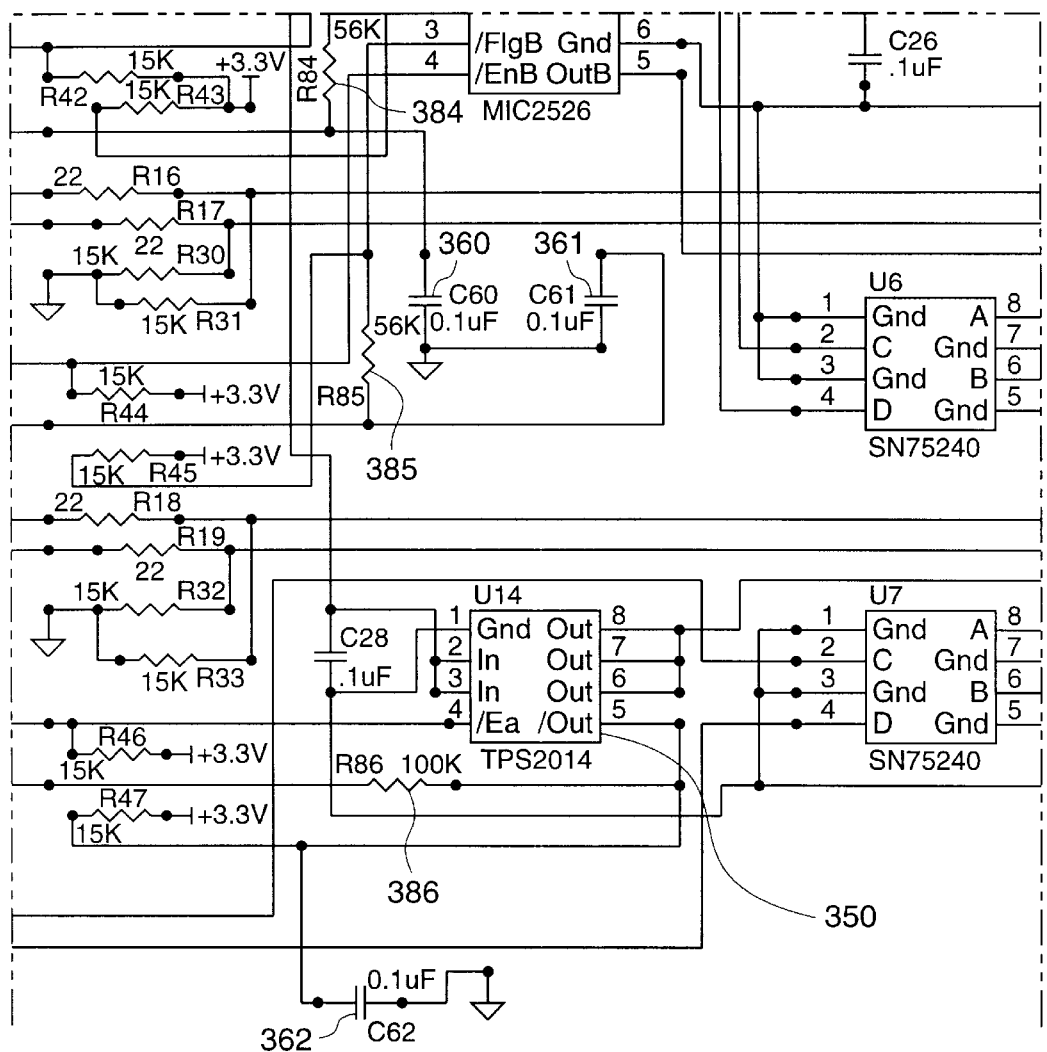
Figures 3, 3H:
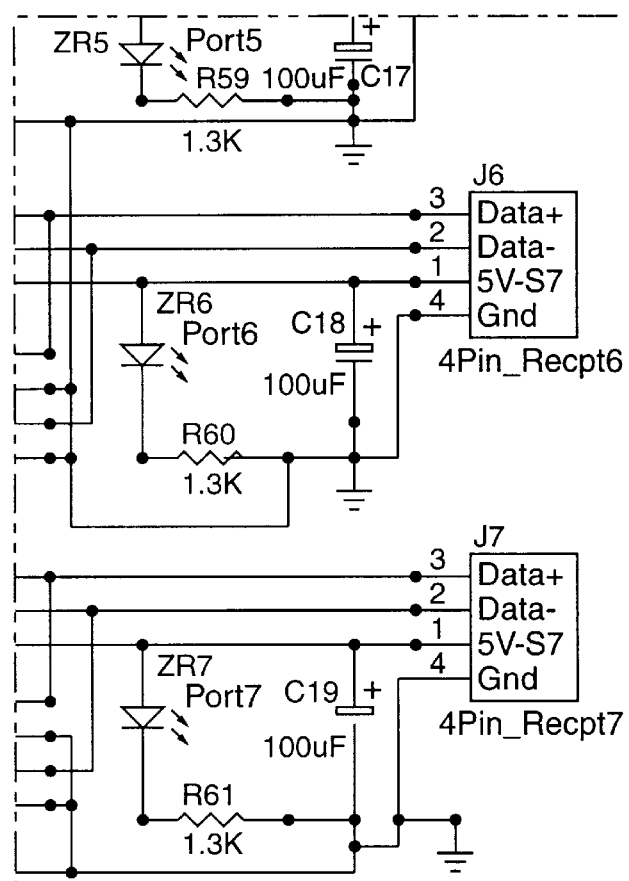
Figure 4:
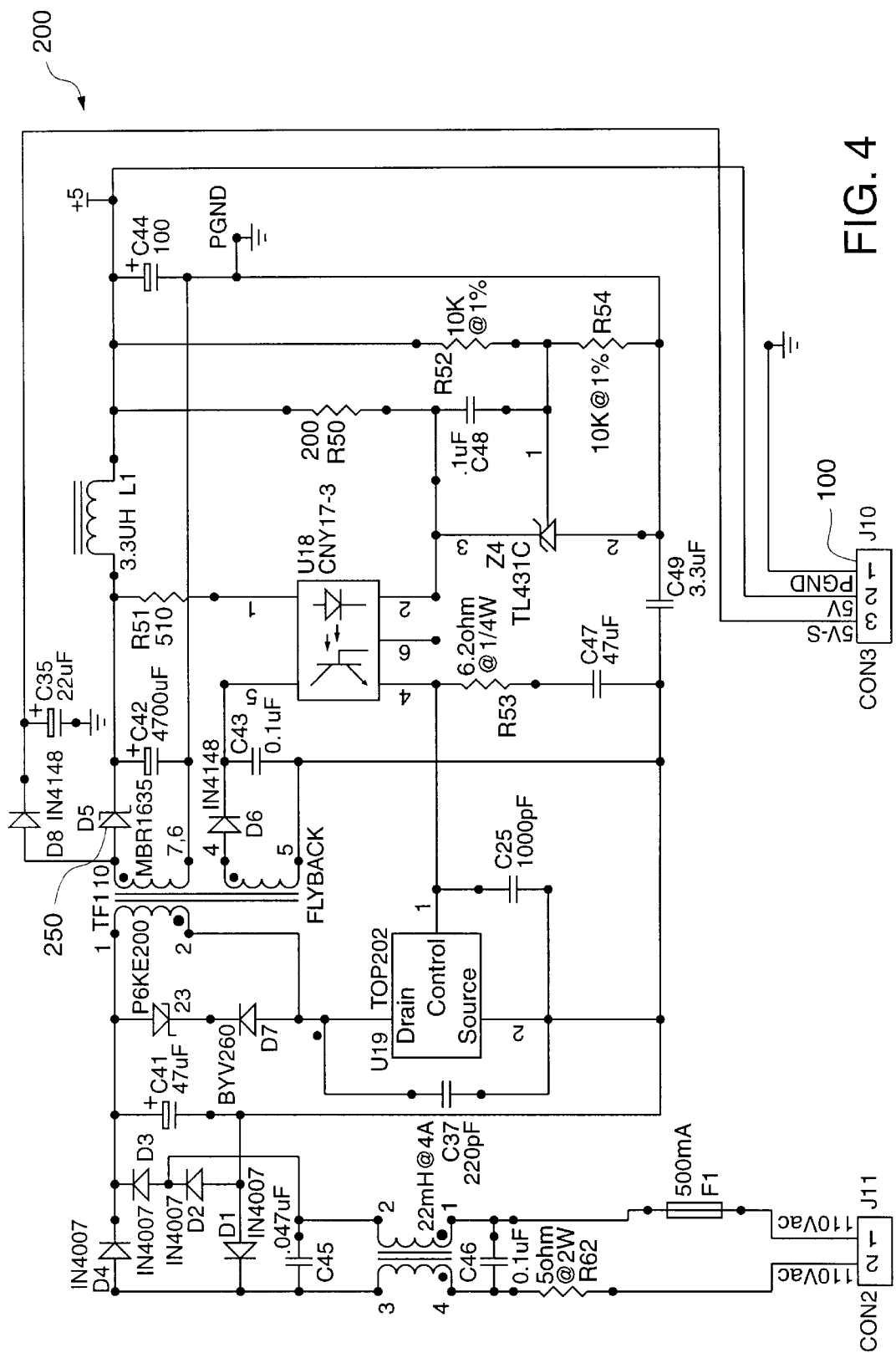
FIG. 4 is a schematic view of a power supply that is suitable for use in the circuit shown in FIG. 3.

FIG. 3 represents a schematic of the hub logic circuitry 600, shown as the area bounded by the line from point A to point B which includes switching circuitry and detection circuitry, the USB Controller 110, and other hub circuitry for USB connection to peripherals. The USB Controller 110 is known in the art and is represented in an exemplary system as part number TUSB2070, manufactured by TEXAS INSTRUMENTS™. FIG. 4 represents the power supply 200 coupled to the logic circuitry 600 through connector 100. The power supply 200 is known in the art as a ST204A Power Supply manufactured by Power Integrations and is described in the Power Integrations, Inc. Data Book and Design Guide, 1996–97, incorporated herein by reference.

FIGS. 3 and 4 together demonstrate an embodiment in which the operating system and the host controller smoothly transition between running in bus-powered mode and self-powered mode. The circuit provides for this smooth transition through interrupting communication between the hub and the host controller through "global resets." The circuit sends a reset signal to the host controller 30 while at the same time providing a ramp-up time for the hub 25 to transition into either bus-powered mode or self-powered mode before allowing the hub 25 to once again receive data signaling. The logic circuitry 600 provides for the power source change while the data transmission from the host controller 30 through connector 111 is terminated and hub 25 is in a reset mode.

Operation of Automatic Switching

Referring to FIG. 3 and FIG. 4, in combination, follow the 5 V_S signal on line 140 shown at connector 100. The power supply 200, shown in FIG. 4, generates the signal on line 140 when the power supply 200 is powered on and enabled and pins 2 and 3 on connector 100 show 5 volts. The voltage on Pin 3, signal line 140, of connector 100 is "clamped" by the Zener diode 101 to produce 3.3 Volts. The presence of the signal line 140 causes three events to occur. First, a "global reset" occurs. Second, Pin 10 of the USB Controller 110, "/Buspwr" 300 de-asserts thereby signaling that the USB Controller 110 is entering self-power mode. Third, power from the host controller 30 is removed thereby terminating bus-powered mode.

Removal of Bus-powered Mode

Bus-powered mode is terminated by disabling switch 116, shown as part number TPS2041, which is a Power Switch used to switch the host controller 30 power bus onto the hub 25 power bus. Pin 4 of switch 116 controls the switch through an active low "Enable". The presence of a signal on line 140, which is considered a logic "high", appears at Pin 4 of switch 116 when the power supply 200 is powered "on". Thus, switch 116 and a signal on line 140 function as both the switching circuitry and the detection circuitry. When signal 140 is not present, resistors shown in the logic circuitry 600 electrically coupled to Pin 4 of switch 116, such as resistor 310, shown as 27 KOhms, provide a reference to ground. This provides a "Logic Low", thereby enabling switch 116. Note that this system of switching power disables the power from the host controller 30 when self power is enabled, thereby preventing damage that could occur to the host computer 20. Additionally, as discussed below, the system and method conveniently terminates bus-supplied power when the power supply 200 is powered on even when bus-powered mode is operational by reinitializing the hub 25 through "global reset."

Global Reset

Global reset refers to the global initialization or reinitialization of hub 25. As explained below, global reset has several components, an approximately 0.4 second time dela, and two low voltage pulses, one with a pulse width of approximately 750 $\mu$ Secs used for resetting the hub after self-power is initiated, and one with a pulse width of approximately 2 $\mu$ Secs used for resetting the hub after self power is removed. These components reset the USB Controller 110 and communication of reset conditions with the host controller 30.

Global reset occurs when a signal on line 140 is present and resistor 102 begins to charge capacitor 103, whose voltage is seen at comparator 104's noninverting input, Pin 3. This is called the Primary Time delay and is approximately 0.4 seconds. This 0.4 second time delay allows the +5 Volts on Pin 2 of Connector 100 from the Power Supply 200 to stabilize. When the voltage across capacitor 103, which is coupled to the noninverting input of comparator 104, Pin 3, passes the voltage level at the inverting input of comparator 104, Pin 2, the comparator 104 switches its output located at Pin 1 from a "Low" to a "High" voltage. The voltage divider made up of resistor 105 and resistor 106 assures that the voltage at the inverting input of comparator 104, Pin 2 is higher then the voltage at the noninverting input of comparator 104, Pin 3 prior to the presence of signal 140. Therefore, comparator 104 output Pin 1 will be "Low" (an initial condition) prior to the signal 140 presence.

The resistor-capacitor network pairs including resistor 108 and capacitor 109, and resistor 120 and capacitor 121, are positive feedback elements preventing oscillations from the slow rising voltage across capacitor 103.

The output voltage of comparator 104, Pin 1 reaches capacitor 180 and resistor 112. At the time just after switching, the output voltage of comparator 104, Pin 1 reaches resistor 112. Resistor 112 is coupled with the Pin 6 of comparator 107, the inverting input. When this voltage (3.3 V) appears at comparator 107, Pin 6, Pin 7 of comparator 107 switches from a "High" to a "Low." The voltage divider made up of resistors 105 and 106 assures that the voltage at Pin 5 of comparator 107 is higher then the voltage at Pin 6 of comparator 107 prior to the presence of signal 140. Thus, Pin 7 of comparator 107 exhibits a "High" thereby indicating an initial condition and no reset to USB Controller 110 before signal 140 appears. As time goes on, capacitor 180 charges and the voltage across resistor 112 reduces. After approximately 750 $\mu$ Secs, the voltage at resistor 112, which is coupled to the inverting input of comparator 107, is less than the voltage appearing at the noninverting input, Pin 5 of comparator 107, thereby switching the output of comparator 107, Pin 7 back to 3.3 Volts. Note that this is a low voltage pulse with a pulse width of approximately 750 $\mu$ Secs. discussed above, and that the pulse begins approximately 0.4 seconds after the power supply 200 is powered "on" and "Self Power" is enabled. This pulse resets the USB Controller 110.

Another component of global reset concerns communication of the hub 25 with the host Controller 30. The logic circuitry 600 signals to the upstream host Controller 30 that a device is attempting to enumerate. Enumeration refers to attaching and requesting initialization from the host Controller 30. The logic circuitry 600 accomplishes this using a resistor 320 coupled to the reset line of the USB Controller 110, Pin 25. Resistor 320 electrically couples to the gate of MOSFET Transistor 113. Note that a bipolar junction transistor may replace the MOSFET, in which case resistor 320 couples to the base of the bipolar transistor. Further, if a bipolar junction transistor is used, the connection between resistor 320 and voltage source 130 would not be an open circuit, but would be closed with an additional resistor added. When there is voltage of 3.3 volts on resistor 320, the MOSFET Transistor 113 drives transistor 113 to the "on" state, which then provides a path for a 3.3 volt signal through pull-up resistor 123 onto the upstream port of connector 111, Pin 3, shown as "Data+."

The presence of a voltage at pull up resistor 123 signals to the upstream host 30 that a device is trying to enumerate. When transistor 113 disables, the host 30 considers the device to be disengaged, thereby releasing the upstream of connector 111 port for a new device to attach. Thus, when the reset line, Pin 25 of the USB controller 110, is enabled (logic "low"), the host Controller 30 releases the port to which the hub 25 is attached. When the reset line is disabled (logic "high") the host Controller 30 re-enumerates, thereby attaching the hub 25. This attaching and detaching is how the hub 25 identifies itself as a self or bus-powered device to the operating system of computer 20.

Before the global reset discussed above occurs, the 3.3 volts developed across the Zener diode 101 is also at Pin 4 of Switch 116 as well as at Pin 10 of the USB Controller 110. The input pins of switch 116 connect to the 5 Volts, the power supplied from the host controller through connector 111. When Pin 4 of switch 116 reaches 3.3 volts, the switch 116 opens and the input signals of switch 116, at Pins 2 and 3, are removed from Pins 7 and 6, respectively. This acts to prevent the host controller 30 from powering the hub. Pin 10 of the USB Controller 110 functions to signal the USB Controller that the hub is in self-powered mode. The USB Controller does not recognize that the hub is in self-powered mode until 0.40075 seconds later.

Global Reset When Exiting Self-Power Mode

When the hub 25 operates in self-powered mode and self power terminates, the hub 25 reverts to the host Controller 30 supplied power and performs a global reset. The global reset occurs when exiting self-powered mode and entering bus-powered mode. Terminating self power means terminating the signal on line 140, discussed above. When power is not provided through the power supply 200, the power discharges from the resistor-capacitor network of resistor 102 and capacitor 103 through resistor 310 and other resistors in parallel with resistor 310 to ground. When the voltage at capacitor 103, which couples to the non inverting input, Pin 3 of comparator 104, passes the voltage at the inverting input, Pin 2 of comparator 104, the output, Pin 1 of comparator 104 goes to zero volts, or ground. When Pin 1 goes to ground, the resistor-capacitor network of capacitor 180 and resistor 112 discharges through the path created. Because capacitor 180 is fully charged when Pin 1 of comparator 104 goes to ground, a negative voltage is produced across resistor 112 and across the inverting input of comparator 107, Pin 6. A negative voltage at comparator 107 input overrides the normal operation of comparator 107 and sends the signal at output Pin 7 to ground, as long as the comparator 107 input is a large negative voltage. This feature of comparators makes for an efficient circuit that avoids additional circuitry. It is because of this feature of comparators that a reset is generated when self power is terminated. The length of the reset pulse is approximately 2 $\mu$ Secs. This 2 $\mu$ Secs. is the length of time the negative voltage at Pin 5 of comparator 107, the noninverting input, is close to its maximum.

Global Reset During Bus-Powered Mode

Global Reset occurs during bus-powered mode through switch 116. Switch 116 asserts reset of the USB Controller 110, Pin 25 when its input voltage, shown as the 5 V-S Pin 1 of connector 111, stabilizes. The output lines, shown as Pins 6, 7 and 8, of Switch 116 regulate the 3.3 volts that powers the USB Controller 110 and its associated circuitry. Note that the 3.3 volts output from switch 116 is not the 3.3 volts from the 5 Volts line, Pin 1 of connector 111. Switch 116 first stabilizes the 3.3 volts and then releases the Reset line on the USB Controller 110.

Operation of Power Supply

Referring to FIGS. 3 and 4 together, note that when the power from the power supply 200 is removed, it appears that power is being supplied to the power supply through pin 2 of connector 100 from switch 116, pin 8. This is not the case. In order to prevent power from being routed to the power supply 200, the power supply 200 circuit is equipped with a Schottky-barrier diode 250, shown as part number MBR1635, which acts to prevent any voltage from passed beyond the Schottky-barrier diode 250 on the power supply 200 from the hub 25. The power supply is a conventional flyback switching power supply with an adjustable output voltage and voltage and power rectifiers. The power supply 200 is a so-called "offline switcher" that switches the higher 110 Volt line from its power source, and does not switch a low voltage from a transformer, as might be seen in other power supplies. Other power supplies not referenced here can be substituted by those skilled in the art and still be within the scope of an embodiment presented herein.

Example
Switching from Bus-Powered Mode to Self-Powered Mode

With reference to FIG. 3, in combination with FIG. 2, an example of how the logic circuitry 600 communicates with the host controller 30 and USB Controller 110 indicating that the hub 25 switched from a bus-powered mode to a self-powered mode is presented. In this example, hub 25 is first initialized to bus-powered mode. Peripheral devices, in this example represented by a scanner 21 and a modem 22, are attached to hub 25. The power supply 200 coupled to the hub 25 is powered on. According to an embodiment described above, supplying power to the power supply 200 places the USB Controller 110 into reset mode, thereby automatically relaying to the operating system of the host controller 30 an indication to terminate data transmittal. This occurs even if the hub 25 was running in bus-powered mode at the time the power supply 200 is powered on.

Referring to FIGS. 3 and 4, when the power supply 200 is powered on, the voltage at connector 100 is routed through Zener diode 101 to switch 116 and at the same time routed indirectly to capacitor 180 through comparator 104. The voltage from the Zener diode 101 immediately reaches Switch 116 and the USB Controller 110 pin 10, "/Buspwr", shown as a "Not" enabled switch. Thus, the USB Controller will no longer be in bus-powered mode when the Zener diode 101 is activated upon powering up of the power supply 200 and the USB Controller 110 receives a reset signal.

Example
Switching from Self-Powered Mode to Bus-Powered Mode

With reference to FIGS. 3 and 4, an example of how the logic circuitry 600 communicates with the host controller 30 and the USB Controller 110 to indicate that hub 25 switched from a self-powered mode to a bus-powered mode is presented. In this example, hub 25 is first initialized to self-powered mode with the power supply 200 powered on. After hub 25 is initialized to self-powered mode, the power supply 200 is powered down, but the hub 25 remains coupled to the host controller 30 through connector 111. According to an embodiment described above, removing power from the power supply 200 puts the USB Controller 110 into reset mode, thereby automatically relaying to the operating system of the host controller 30 to suspend data transmittal.

When the power supply 200 is powered down, switch 116 is enabled and capacitor 180 will no longer be charged via comparator 104. As stated above with reference to the example of switching from bus-powered mode to self-powered mode, the voltage from the Zener diode 101 will immediately reach the USB Controller 110 pin 10, "/Buspwr" and will switch the USB Controller 110 into bus-powered mode when the reset is asserted.

Time Delay Added to Delay Over Current Pin from Triggering

Referring to FIG. 3, the following resistor-capacitor pairs: 380 and 356; 381 and 357; 382 and 358; 383 and 359; 384 and 340; 385 and 341; 386 and 342 provide a time delay before triggering an over-current condition to the USB Controller 110. The time delay prevents devices attached to the hub 25 that have large input capacitors from appearing temporarily as shorts to switches 116 and 350. As these large input capacitors charge, the switches 116 and 350 output an overcurrent warning signal (/overcurrent=0 volts). This overcurrent condition begins to discharge its associated capacitors listed above. After the large input capacitors charge up, the resistor-capacitor pairs begin to charge back to their "high" logic level state and the USB Controller 110 never sees the warning signal. If a true short exists, then the resistor-capacitor pairs will discharge completely and the USB Controller 110 will disable the respective switch. Other components shown in FIG. 3 and not described herein are conventional USB hub circuitry, including, for example, components for purposes of connecting peripherals attached to the hub 25 through the USB Controller 110.

Method of Operation

Figure 5:
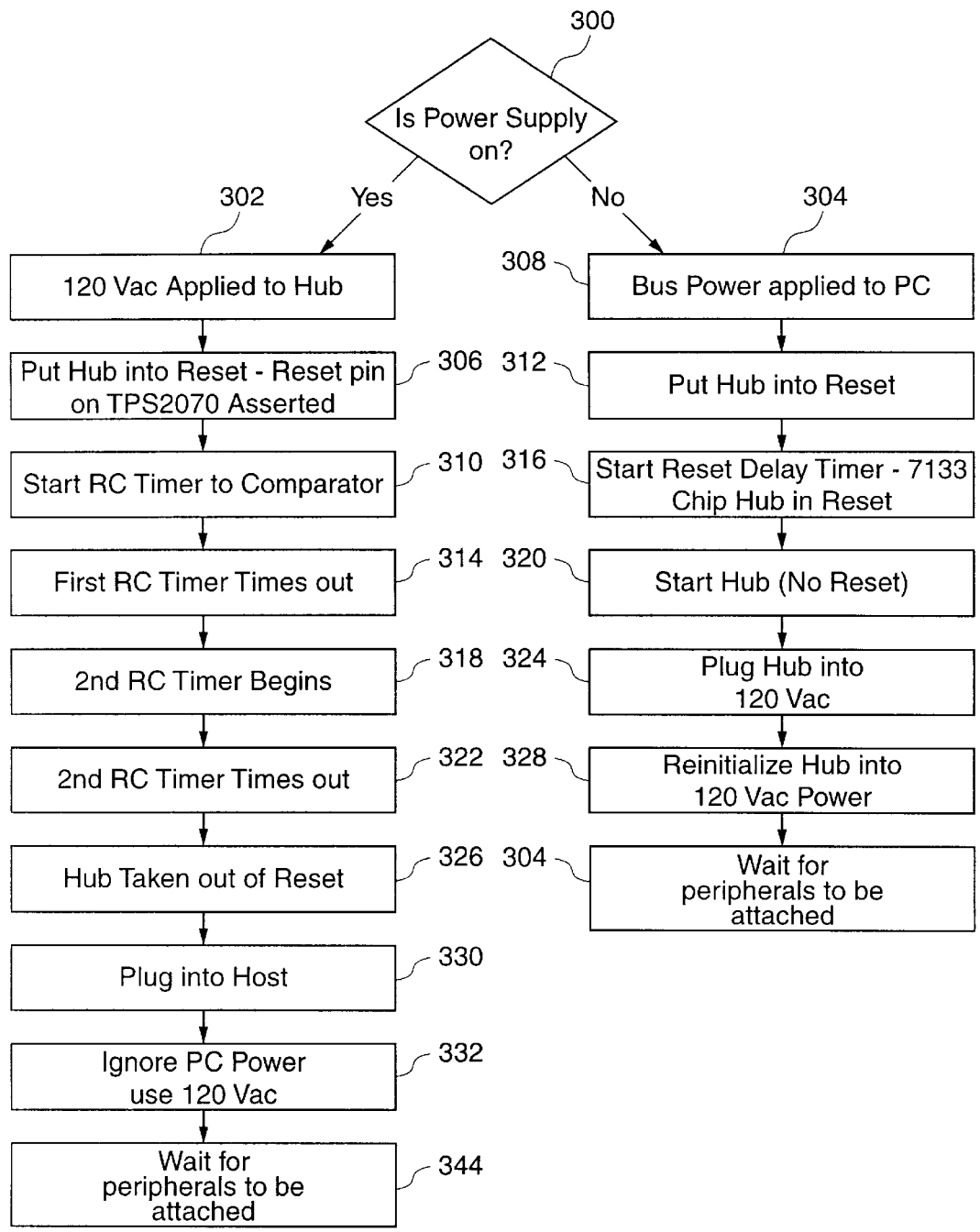
FIG. 5 is a state flow diagram illustrating an example of the operation of the universal serial bus hub shown in FIG. 3.

Referring to FIG. 5 in combination with FIGS. 3 and 4, a state flow diagram is represented showing the manner in which a hub 25 built according to an embodiment of this invention would transition between bus-powered mode and self-powered mode. The first step 300 in the state machine (e.g. a computer program resident in and executed by USB Controller 110 in conjunction with logic circuitry 600) relates to determining whether or not power supply 200 is supplying power to the hub 25. If power supply 200 supplies power to hub 25, indicating step 302, then, as shown in step 306, the USB Controller 110 will initialize hub 25 as a self-powered hub by putting the hub 25 into reset cycle. Steps 310, 314, 318, 322 and step 326 provide the steps taken by the logic circuitry 600 for initializing the hub 25 for self-powered mode. Steps 310 and 314 provide for a first resistor-capacitor timer, shown in FIG. 3 by the resistor-capacitor pair 102 and 103, to begin a timing sequence by charging to a specified value in accordance with the timing cycle and then discharging. Steps 318 and 322 provide for the second resistor-capacitor timer, shown in FIG. 3 as the resistor-capacitor pair 112 and 180 to begin timing sequence by charging to the A. specified value in accordance with the timing cycle and then discharging. The next step, step 326, provides that the hub 25 is taken out of reset. At this point, if the hub 25 was not previously coupled to a host controller 30, and then hub 25 was later coupled to a host controller 30, the self-powered mode would take precedence over bus-powered mode. Thus, as indicated in step 332, the power from an upstream bus is ignored.

If the power supply 200 is not powered on, the hub 25 will check for power according to step 300 from an upstream host, as shown in step 304. Once power is received from an upstream host, step 308 provides that the hub 25 will go into reset mode. Next, in step 312, switch 115, as shown in FIG. 3, will perform the reset cycle by holding the hub 25 in reset until power stabilizes. In step 316, the hub 25 will be "on" with reset de-asserted. At this point, if the power supply 200 is powered on, as in step 320, the hub 25 initializes, as indicated in step 324 to self-powered mode. As shown, self-powered mode will take precedence over bus-powered mode. Once the hub 25 is initialized, the hub is ready for peripherals to be attached as in steps 328 and 334.

While the invention has been described with reference to various embodiments, it will be understood that these embodiments are illustrative and that the scope of the invention is not limited to them. Many variations, modifications, additions and improvements of the embodiments described are possible. For example, one skilled in the art could apply the information contained herein to serial bus hubs in general as well as to universal serial bus hubs.

Variations and modifications of the embodiments disclosed herein may be made based on the description set forth herein, without departing from the scope and spirit of the invention as set forth in the following claims.

What is claimed is:

1. A bus hub for connection via a serial bus to a serial bus host hub, the bus hub comprising:

a serial bus hub having a connector to a power supply, the serial bus hub also receiving power from the serial bus host hub;

a bus controller coupled to the serial bus hub; and a switch coupled to the bus controller and to the power supply, wherein the switch switches the bus hub between being powered by the power supply and being powered by the power from the serial bus host hub.

2. The serial bus hub of claim 1 wherein the serial bus is a universal serial bus; the serial bus hub is a universal serial bus hub; and the serial bus host hub is a universal serial bus host hub.

3. The serial bus hub of claim 1, wherein the serial bus host hub is one of a serial bus host hub in a computer and a serial bus host hub in a computer peripheral.

4. The serial bus hub of claim 1, wherein:

the power supply connected to the serial bus hub provides power to the serial bus hub in a self-powered mode, and the serial bus host hub provides power to the serial bus hub in a bus-powered mode;

the switch switches the mode of operation between the self-powered mode and the bus-powered mode when one of a signal from the power supply to the serial bus hub indicates that the power supply is available to the serial bus hub and a signal from the power supply to the serial bus hub indicates that power from the power supply is unavailable to the serial bus hub; and the signal that power is unavailable from the power supply to the serial bus hub is the indication to change modes when the serial bus hub is running in the self-powered mode.

5. The serial bus hub of claim 1, wherein:

the serial bus controller coupled to the serial bus hub initializes the serial bus hub upon receiving the signal that power is unavailable from the power supply and upon receiving the signal that power is available from the power supply.

6. The serial bus hub of claim 1, further comprising:

at least one timer circuit coupled via a connector to the power supply, wherein the timer circuit provides a delay for power supplied to the serial bus hub to stabilize prior to the initializing of the serial bus hub, and the timer circuit outputs a low voltage pulse to reset the bus controller.

7. The serial bus hub of claim 6 wherein the low voltage pulse has a pulse width of approximately 750 $\mu$ Secs. and begins approximately 0.4 seconds after the power supply begins supplying power to the serial bus hub.

8. The serial bus hub of claim 6 wherein the at least one timer circuit is a resistor-capacitor timer.

9. The serial bus hub of claim 1 further comprising:

a plurality of connectors coupled to the serial bus hub, the plurality of connectors being adapted for detachably coupling a plurality of peripherals to the serial bus hub.

10. The serial bus hub of claim 1 wherein the switch comprises a field effect transistor.

11. The serial bus hub of claim 1 wherein the switch comprises a bipolar junction transistor.

12. The serial bus hub of claim 1 wherein the switch comprises a plurality of switches electrically coupled to a serial bus.

13. The serial bus hub of claim 1, further comprising:

logic circuitry that communicates reset commands to the bus controller, the logic circuitry including at least one comparator, at least one Zener diode, at least one voltage dividing circuit, and at least one timer circuit, the Zener diode electrically coupled to the power supply and the at least one comparator, the at least one comparator also being electrically coupled to the at least one timer circuit and the at least one voltage dividing circuit.

14. The serial bus hub of claim 13, wherein the power supply is coupled to the logic circuitry via a connector, the power supply comprising:

a flyback switching power supply; and a Schottky-barrier diode, the Schottky-barrier diode being in the flyback switching power supply to prevent power from the serial bus hub from entering the power supply past the Schottky-barrier diode.

15. A system for controlling communication and power in a serial bus comprising:

a serial bus hub adapted to detachably couple at least one peripheral to a computer system, the computer system including a processor, a memory, and a serial bus host hub capable of delivering power to the serial bus hub;

a power supply electrically coupled to the serial bus hub, the power supply capable of delivering power to the serial bus hub;

a bus controller coupled to the hub, wherein the bus controller receives signals from the computer system through the serial bus, and the bus controller receiving signals from the serial bus hub; and a switch coupled to the bus controller and to the power supply, wherein the switch switches the serial bus hub between being powered by the power supply and being powered by the power from a serial bus host hub.

16. The system of claim 15 wherein the switch comprises a field effect transistor.

17. The system of claim 15 wherein the switch comprises a bipolar junction transistor.

18. The system of claim 15 wherein the serial bus is a universal serial bus; the serial bus hub is a universal serial bus hub; and the serial bus host hub is a universal serial bus host hub.

19. The system of claim 15, wherein the serial bus host hub is one of a serial bus host hub in a computer; and a serial bus host hub in a computer peripheral.

20. The system of claim 15, further comprising:

logic circuitry coupled to the switch, wherein the logic circuitry initializes the serial bus hub to a first mode, the first mode being one of self-powered mode in which the serial bus hub is powered by the power supply and bus-powered mode in which the serial bus hub is powered by the power supplied by the serial bus host hub, wherein the logic circuitry detects whether the power supply is powered on, and the logic circuitry then initializes the serial bus hub to self-powered mode if the first mode is bus-powered mode.

21. The system of claim 20, wherein the logic circuitry includes:

at least one timer circuit coupled to the power supply via a connector, the at least one timer circuit being responsive to signaling from the power supply, the at least one timer circuit providing a delay for power supplied to the serial bus hub to stabilize prior to the logic circuitry initializing the serial bus hub, and wherein the at least one timer circuit outputs a low voltage pulse to reset the bus controller.

22. The system of claim 20, wherein the logic circuitry includes:

a Zener diode coupled to the switch, the Zener diode further electrically coupled to the power supply, the Zener diode clamping the signal voltage from the power supply; and a plurality of voltage dividing circuits coupled to the Zener diode and the at least one timer circuit, the at least one timer circuit including a plurality of comparators electrically coupled to the plurality of voltage dividing circuits, the plurality of comparators outputting a reset signal to the bus controller when a change in power mode occurs.

23. The system of claim 15 wherein the power supply comprises:

a flyback switching power supply; and a Schottky-barrier diode, the Schottky-barrier diode being in the flyback switching power supply to prevent power from the serial bus hub from entering the power supply past the Schottky-barrier diode.

24. The system of claim 15 wherein the power supply further comprises an offline switcher.

25. A method for communicating and for control of power in a serial bus hub that detachably couples a plurality of peripherals to a computer, the computer including a host hub powered by the computer, the serial bus hub being coupled to a power supply, the method comprising:

determining whether the serial bus hub is receiving power from the power supply;

if the serial bus hub is receiving power from the power supply, initializing the serial bus hub to receive power from the power supply;

if the serial bus hub is not receiving power from the power supply, initializing the serial bus hub to receive power from an upstream serial bus host hub coupled to the serial bus hub; and supplying power to the plurality of peripherals coupled to the hub.

26. The method of claim 25 wherein the serial bus hub is a universal serial bus hub; and the upstream serial bus host hub is an upstream universal serial bus host hub.

27. The method of claim 25 wherein the upstream serial bus host hub is one of a serial bus host hub in a computer and a serial bus host hub in a computer peripheral.

28. The method of claim 25 further comprising:

after initializing the serial bus hub to receive power from an upstream serial bus host hub, detecting that the power supply has been powered on; and initializing the serial bus hub to receive power from the power supply coupled to the serial bus hub.

29. The method of claim 25 further comprising the steps of:

detecting that the power supply has been powered off; and with the serial bus hub in a self-powered mode, reinitializing the serial bus hub to receive power from the upstream serial bus host hub upon detecting the power supply has been powered off.

30. The method of claim 25 further comprising:

detecting that the power source from the serial bus host hub has been powered off; and with the serial bus hub in a bus-powered mode, powering down the serial bus hub.

31. The method of claim 25 further comprising:

detecting that the power source from the serial bus host hub has been powered off;

switching the serial bus hub to self-powered mode; and providing power to the serial bus hub from the power supply.

* * * * *